United States Patent
Tanaka

(10) Patent No.: US 8,854,498 B2
(45) Date of Patent: Oct. 7, 2014

(54) IMAGE PICK-UP APPARATUS AND CONTROL METHOD THEREOF

(75) Inventor: Katsumasa Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 13/285,070

(22) Filed: Oct. 31, 2011

(65) Prior Publication Data

US 2012/0113282 A1     May 10, 2012

(30) Foreign Application Priority Data

Nov. 10, 2010     (JP) .................................. 2010-251548
Sep. 2, 2011     (JP) .................................. 2011-191467

(51) Int. Cl.
    *H04N 5/76*     (2006.01)
    *H04N 5/232*     (2006.01)
    *H04N 9/82*     (2006.01)
    *H04N 5/77*     (2006.01)

(52) U.S. Cl.
    CPC ......... *H04N 5/23245* (2013.01); *H04N 9/8205* (2013.01); *H04N 5/772* (2013.01)
    USPC ................... 348/231.6; 348/223.1; 348/220.1

(58) Field of Classification Search
    USPC ....................... 348/220.1, 223.1, 222.1, 231.3
    See application file for complete search history.

(56) References Cited

U.S. PATENT DOCUMENTS 6,301,440 B1 *    10/2001    Bolle et al. .................... 396/128

FOREIGN PATENT DOCUMENTS

JP     2009-159224     7/2009

* cited by examiner

*Primary Examiner* — Paul Berardesca
(74) *Attorney, Agent, or Firm* — Cowan, Liebowitz & Latman, P.C.

(57) ABSTRACT

The image pick-up apparatus has an image pick-up unit that picks up an image and outputs RAW still image data; a creation unit that creates, when the RAW still image data is picked up, a development parameter that is a parameter used in development processing of the RAW still image data; and a saving unit that saves, in a storage unit, the development parameter created when the RAW still image data is picked up as a first development parameter which can be used in development processing of the RAW still image data, and further saves, in the storage unit, a development parameter created at other time as a second development parameter which can be used in development processing of the RAW still image data, when saving the RAW still image data outputted from the image pick-up unit in the storage unit.

14 Claims, 8 Drawing Sheets

IMAGE PICK-UP APPARATUS AND CONTROL METHOD THEREOF

BACKGROUND OF THE INVENTION

1. Field of the Invention

The present invention relates to an image pick-up apparatus and a control method thereof.

2. Description of the Related Art

In recently developed digital cameras and camcorders, pre-development image data (RAW image data) obtained from the image pick-up device can be selected as a save format for the picked-up images (still images, moving images).

When the image based on RAW image data is displayed on a display apparatus such as a monitor, the RAW image data is subjected to development processing and converted into image data after development (post-development image data). The development processing is, for example, a color depth conversion processing, a resolution conversion processing, a color space processing, an exposure correction processing, and a white balance adjustment processing.

Further, development parameters (image parameters) including information such as white balance, exposure, color depth, resolution, and color space are necessary for the development processing of RAW image data.

Therefore, when RAW image data is selected as a save format in a digital camera or camcorder, the development parameters at the time of image shooting are typically saved at the same time as the RAW image data.

However, the development parameters at the time of image shooting are merely reference values for development processing and when such development parameters are used, it does not necessarily mean that the image intended by the user can be displayed. Therefore, when the image intended by the user is not displayed (the case in which the post-development image data (that is, development parameters) are not those that are intended by the user), the user is required to correct the development parameters and perform the development processing again in the apparatus.

Some digital cameras and camcorders have installed therein a plurality of image shooting modes such as a landscape mode and a portrait mode and in some moving image shooting and still image shooting can be performed simultaneously. Where such functions are used, a plurality of development parameters can be created when a still image is picked up.

Japanese Patent Application Publication No. 2009-159224 discloses a technique that makes it possible to select development parameters that are close to the intended ones during the development processing by creating and saving a plurality of development parameters during image shooting with respect to the RAW image data (RAW still image data) obtained by the still image shooting.

SUMMARY OF THE INVENTION

However, since the above-mentioned development parameters include information that changes depending on the image shooting environment, with the conventional technique, all of a plurality of development parameters created at the same time (with the equal image shooting times) are not similar to the intended development parameters when the image shooting environment is not the desired environment.

For example, a plurality of development parameters created at the same time are created with the intention of demonstrating the desirable stroboscopic effect. Therefore, when the desirable stroboscopic effect, such as stroboscopic image shooting in a wide space, is not demonstrated, all of the development parameters created at the same time are not similar to the intended development parameters.

Likewise, when the ambient color temperature changes only at the instant an image is picked up, all of the development parameters created at the same time are not similar to the intended development parameters. For example, in the case where brightness increases instantaneously during image shooting under the effect of light such as solar light or stroboscopic light from another image pick-up apparatus, or in the case where the solar light is blocked and it becomes instantaneously dark when an image is picked up, all of the development parameters created at the same time are not similar to the intended development parameters.

The present invention provides an image pick-up apparatus and a control method thereof that make it possible to correct rapidly the development parameters in the case where the development parameters obtained when a still image is picked up are different from the desirable development parameters.

The present invention in its first aspect provides an image pick-up apparatus, comprising:

an image pick-up unit that picks up an image of an object and outputs RAW still image data;

a creation unit that creates, when the RAW still image data is picked up, a development parameter that is a parameter used in development processing of the RAW still image data and including information that changes depending on image shooting environment; and a saving unit that saves, in a storage unit, the development parameter created when the RAW still image data is picked up as a first development parameter which can be used in development processing of the RAW still image data, and further saves, in the storage unit, a development parameter created at other time as a second development parameter which can be used in development processing of the RAW still image data, when saving the RAW still image data outputted from the image pick-up unit in the storage unit, wherein the second development parameter is at least one development parameter from among a development parameter created for electronic viewfinder display, a development parameter created for moving image shooting, and a development parameter created when RAW still image data other than the saved RAW still image data is picked up.

The present invention in its second aspect provides a control method for an image pick-up apparatus, comprising the steps of:

picking up an image of an object and outputting RAW still image data;

creating, when the RAW still image data is picked up, a development parameter that is a parameter used in development processing of the RAW still image data and including information that changes depending on image shooting environment; and saving, in a storage unit, the development parameter created when the RAW still image data is picked up as a first development parameter which can be used in development processing of the RAW still image data, and further saving, in the storage unit, a development parameter created at other time as a second development parameter which can be used in development processing of the RAW still image data, when saving the outputted RAW still image data in the storage unit, wherein the second development parameter is at least one development parameter from among a development parameter created for electronic viewfinder display, a development parameter created for moving image shooting, and a development parameter created when RAW still image data other than the saved RAW still image data is picked up.

In accordance with the present invention, when the development parameters obtained at the time of still image shooting are different from the desired development parameters, the development parameters can be rapidly corrected.

Further features of the present invention will become apparent from the following description of exemplary embodiments with reference to the attached drawings.

DESCRIPTION OF THE EMBODIMENTS

The image pick-up apparatus according to the present embodiment and a control method thereof will be described in detail hereinbelow with reference to the appended drawings. In the below-described embodiment, the case is assumed, by way of example, in which a still image and a moving image are picked up simultaneously by using a camera (image pick-up apparatus) having an EVF display function. The EVF (Electronic Viewfinder) is a device installed on digital cameras and camcorders.

Figure 1:
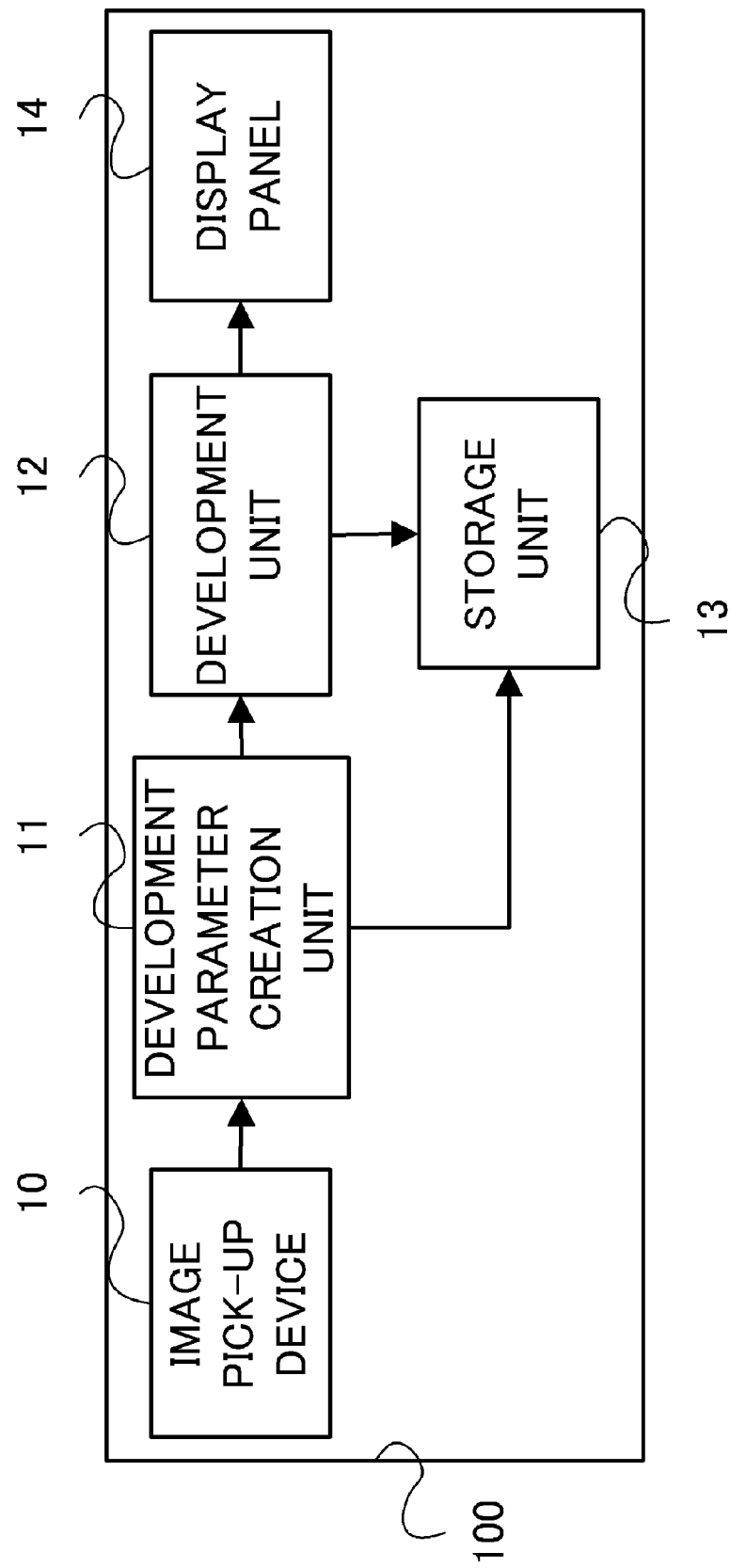
FIG. 1 is a block diagram illustrating an example of functional configuration of the image pick-up apparatus according to the present embodiment.

FIG. 1 is a block diagram illustrating an example of functional configuration of an image pick-up apparatus 100 according to the present embodiment. The image pick-up apparatus 100 includes an image pick-up device 10, a development parameter creation unit 11, a development unit 12, a storage unit 13, and a display panel 14.

The image-pick-up device 10 picks up an image of an object and outputs image data (RAW image data). More specifically, the image pick-up device 10 converts an optical image into electric signals and outputs the signals as RAW image data to the development parameter creation unit 11. The image pick-up device 10 successively outputs the RAW image data with a predetermined time interval (for example, in the case of 60 frames/sec, RAW image data corresponding to each frame is outputted about every 17 ms).

The development parameter creation unit 11 creates development parameters that are used in development processing of the RAW image data, these parameters including information that changes depending on image shooting environment, when the RAW image data is picked up. Examples of information included in the development parameters include information that has been set by the user, information inherent to the apparatus, information that changes depending on the apparatus state, and information that changes depending on the image shooting environment (detection results of a sensor or the like). The information that has been set by the user can be resolution, color space, and the like. The information inherent to the apparatus can be color depth and the like. The information that changes depending on the apparatus state can be exposure and the like. The information that changes depending on the image shooting environment can be a set value that determines white balance, and the like. The development parameter may include information obtained by analyzing RAW image data, such as a histogram.

When EVF display is performed (when an image based on RAW image data is displayed on a display panel 14 (electronic viewfinder)), the development parameter creation unit 11 sends the RAW image data and the development parameters to the development unit 12. Further, when the image data is saved (still image shooting, moving image shooting) and when the RAW image data is selected in a save format of image data, the RAW image data and development parameters are sent to the storage unit 13. The development parameter creation unit 11 creates development parameters according to application. More specifically, the resolution and exposure differ depending on whether the development parameters are for electronic viewfinder display (for EVF display), moving image shooting, and still image shooting. The RAW image data for EVF display, RAW image data for moving image shooting, and RAW image data still image shooting may all have the same resolution, but may also have different resolutions. When the resolutions of the RAW image data for EVF display, RAW image data for moving image shooting, and RAW image data for still image shooting are different, the development parameter creation unit 11 has a resolution conversion function, reduces the resolution of the RAW image data for still image shooting which have the highest resolution and generates the RAW image data for EVF display and for moving image shooting. For example, the resolutions of image data satisfy the following relationship: "resolution of RAW image data for EVF display"<"resolution of RAW image data for moving image shooting"<"resolution of RAW image data still image shooting". The development parameter for EVF display is created from the RAW image data for EVF display, the development parameter for moving image shooting is created from the RAW image data for moving image shooting, and the development parameter for still image shooting is created from the RAW image data still image shooting. The development parameter creation unit 11 also controls the entire image pick-up apparatus 100.

The development unit 12 performs development processing by using the development parameters and the RAW image data acquired from the development parameter creation unit 11 and converts the RAW image data to post-development image data. The development processing is, for example, a color depth conversion processing, a resolution conversion processing, a color space processing, an exposure correction processing, and a white balance adjustment processing. When the EVE display is performed, the created post-development image data is sent to the display panel 14. Further, when saving of image data is performed and the save format of image data is other than the RAW image data (for example, the JPEG format or H.264 format), the created post-development image data is converted to the predetermined format and sent to the storage unit 13.

The storage unit 13 acquires the RAW image data, development parameters, and post-development image data (image data converter to the predetermined format) from the development parameter creation unit 11 and the development unit 12 and stores the acquired data in a memory. The storage unit 13 is provided with a memory having storage capacity sufficient to store the still image or moving image data (RAW image data and post-development image data) and various parameters and also a memory control circuit.

The display panel 14 displays an image based on the post-development image data acquired from the development unit 12 as a target of EVF display. Thus, the display panel 14 functions as an electronic viewfinder.

Figure 2:
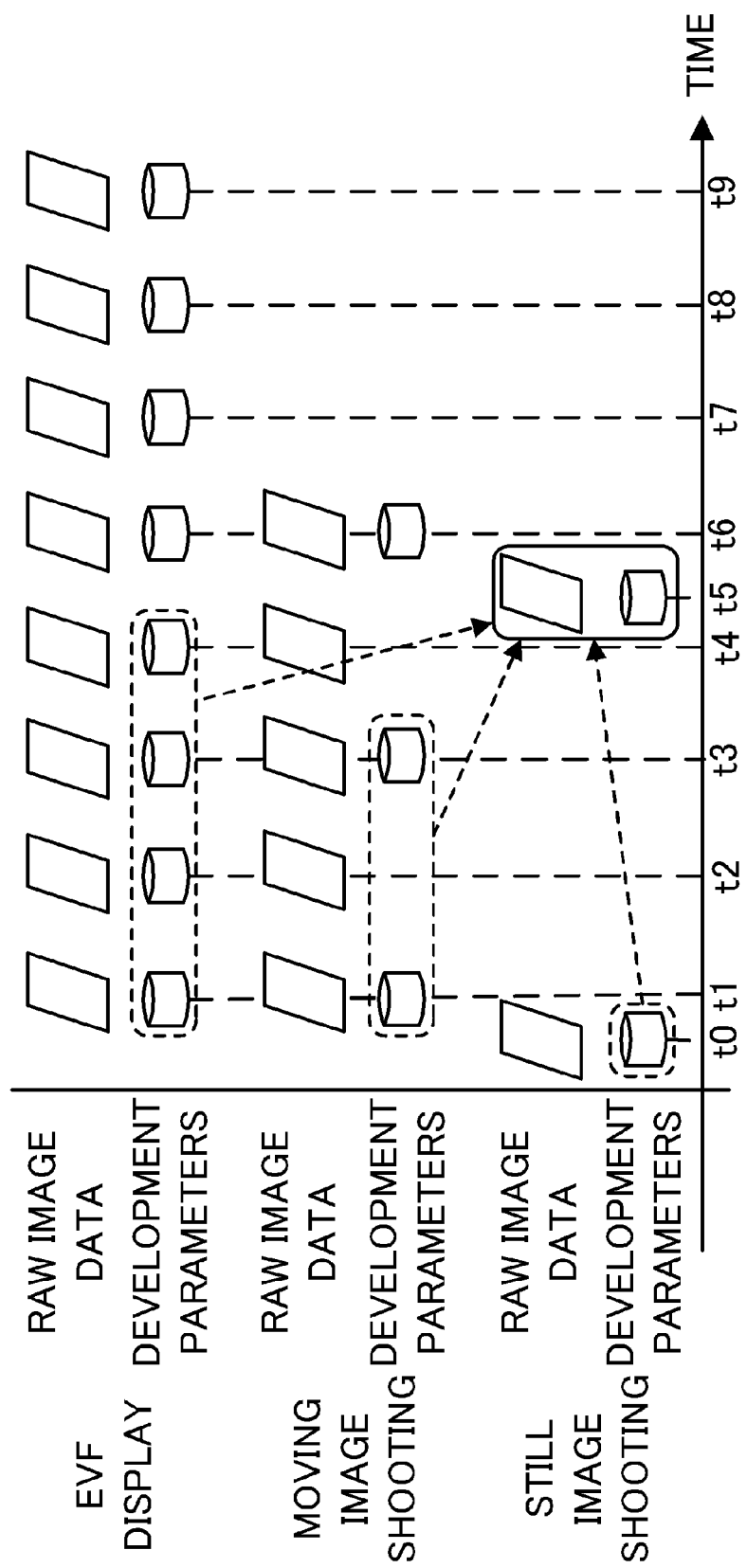
FIG. 2 illustrates an example of relationship between the development parameters and the creation time thereof.

The relationship between the type of development parameters created in the development parameter creation unit 11 and the creation time of the development parameters will be explained below with reference to FIG. 2. The image pick-up apparatus 100 has functions of EVF display, moving image shooting, and still image shooting which are shown on the ordinate in FIG. 2. The development parameter creation unit 11 creates development parameters for EVF display when the RAW image data outputted from the image pick-up device 10 is displayed on the electronic viewfinder (EVF display). Development parameters for moving image shooting and still image shooting are created during moving image shooting and during RAW image data shooting (still image shooting), receptively. The created development parameters are sent to the development unit 12 or storage unit 13.

The EVF display is performed at all times during the operation of the image pick-up apparatus. In the example shown in FIG. 2, the development parameter creation unit 11 creates the development parameters for EVF display with a predetermined interval in the order of times t1, t2, t3, . . . , except times t0 and t5.

The moving image shooting is performed continuously within the period designated by the user. In the example shown in FIG. 2, the moving image shooting is performed from time t1 to time t6, and the development parameter creation unit 11 creates the development parameters for moving image shooting at times t1, t3, and t6. Thus, in the example shown in FIG. 2, one development parameter is created with respect to two-frame RAW image data. The number of created development parameters for moving image shooting may be equal to the number of frames in the moving image.

The still image shooting is performed once at a time indicated by the user. In the example shown in FIG. 2, the still image shooting is performed at the time t0 and time t5, and the development parameter creation unit 11 creates development parameters for still image shooting at times t0 and t5.

Figure 3:
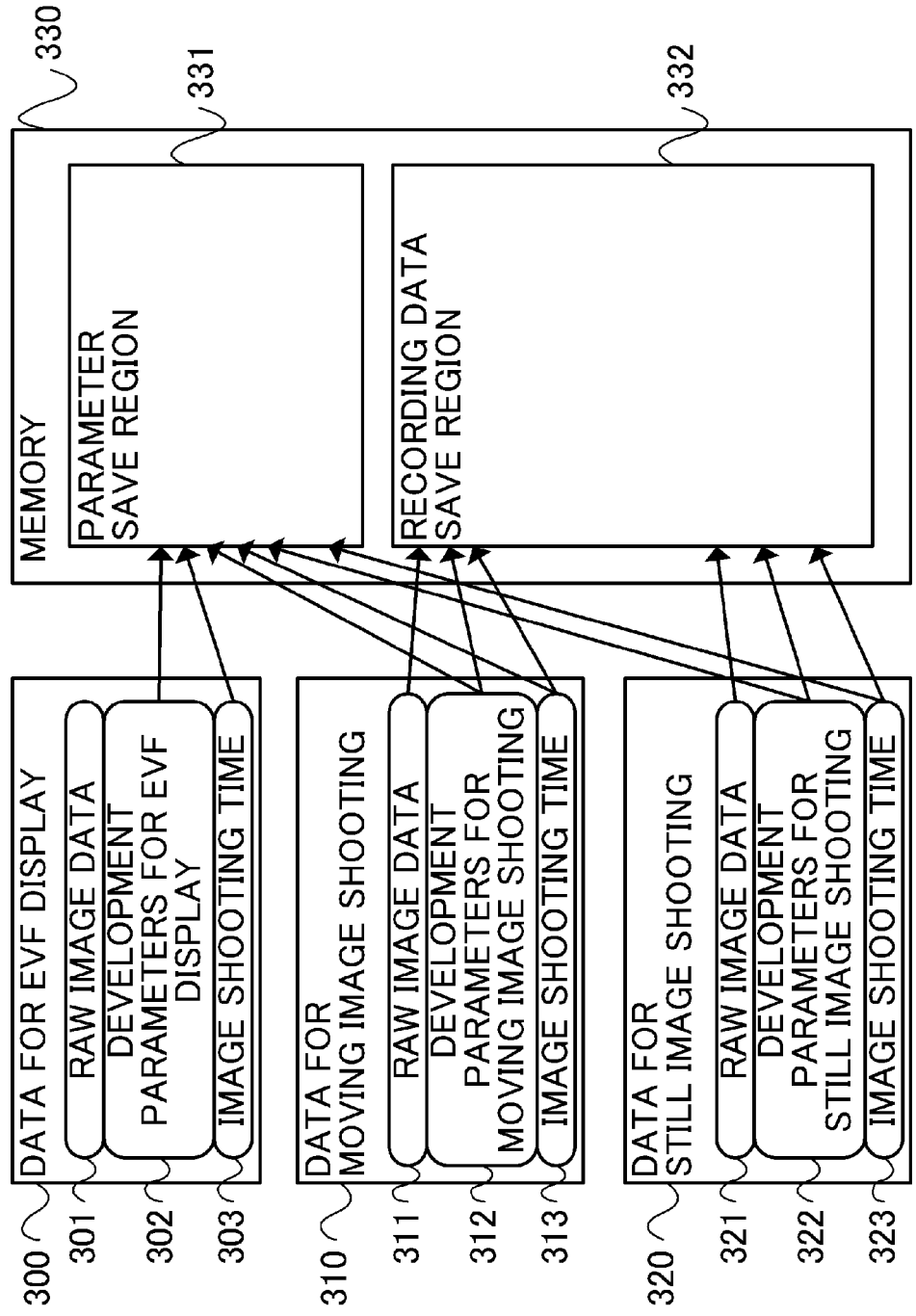
FIG. 3 illustrates an example of relationship between the data saved in the memory and the save region thereof.

FIG. 3 shows the relationship between data type and save region in the case where the above-described development parameters or RAW image data is saved in the memory 330 provided in the storage unit 13.

Data handled by the image pick-up apparatus 100 when still image shooting is performed include data 300 for EVF display and data 320 for still image shooting. Data 310 for moving image shooting is also used when moving image shooting is performed during still image shooting.

The data 300 for EVF display is a group of data created during EVF display, this group including the RAW image data 301, development parameters 302 for EVF display, and an image shooting time 303.

The data 310 for moving image shooting is a group of data created during moving image shooting, this group including the RAW image data 311, development parameters 312 for moving image shooting, and an image shooting time 313.

The data 320 for still image shooting is a group of data created during still image shooting, this group including the RAW image data 321 (RAW still image data), development parameters 322 for still image shooting, and an image shooting time 323.

The above-described data is saved in the memory 330 in two separate regions: a parameter save region 331 and a recorded data save region 332.

The memory 330 may be fixedly mounted on the image pick-up apparatus 100 or may be a removable storage (for example, a SD card). Further, the fixedly mounted memory and the removable storage may be used together.

In the present embodiment, when the RAW image data (RAW still image data) outputted from the image shooting device 10 when still image shooting is performed is saved in the memory (storage unit), the below-described first and second development parameters are saved as the development parameters that can be used for the development processing of the RAW image data.

The first development parameter is a development parameter created when the RAW image data that will be saved is picked up.

The second development parameter is a development parameter created at other times (times other than the shooting time of the RAW image data that will be saved).

The parameter save region 331 is a region in which the development parameter created before the still image shooting and the shooting time thereof are temporarily saved in order to save the development parameter created before the image shooting as the second development parameter in the below-described recording data save region 332. As described hereinabove, in the present embodiment, any of the development parameters for EVF display, development parameters for moving image shooting, and development parameters for still image shooting that have been created at the shooting time of RAW image data different from the RAW image data that will be saved is saved as the second development parameter. Therefore, the development parameters 302 for EVF display, image shooting time 303, development parameters 312 for moving image shooting, image shooting time 313, development parameters 322 for still image shooting, and image shooting time 323 are saved in the parameter save region 331. The aforementioned data saved in the parameter save region 331 are arranged in the order of image shooting time.

The recording data save region 332 is a recording region in which the shooting RAW image data and development parameters that can be used for development processing of the RAW image data are saved. Therefore, the RAW image data 311, development parameters 312 for moving image shooting, image shooting time 313, RAW image data 321, development parameters 322 for still image shooting, and image shooting time 323 are saved in the recording data save region 332.

Figure 4:
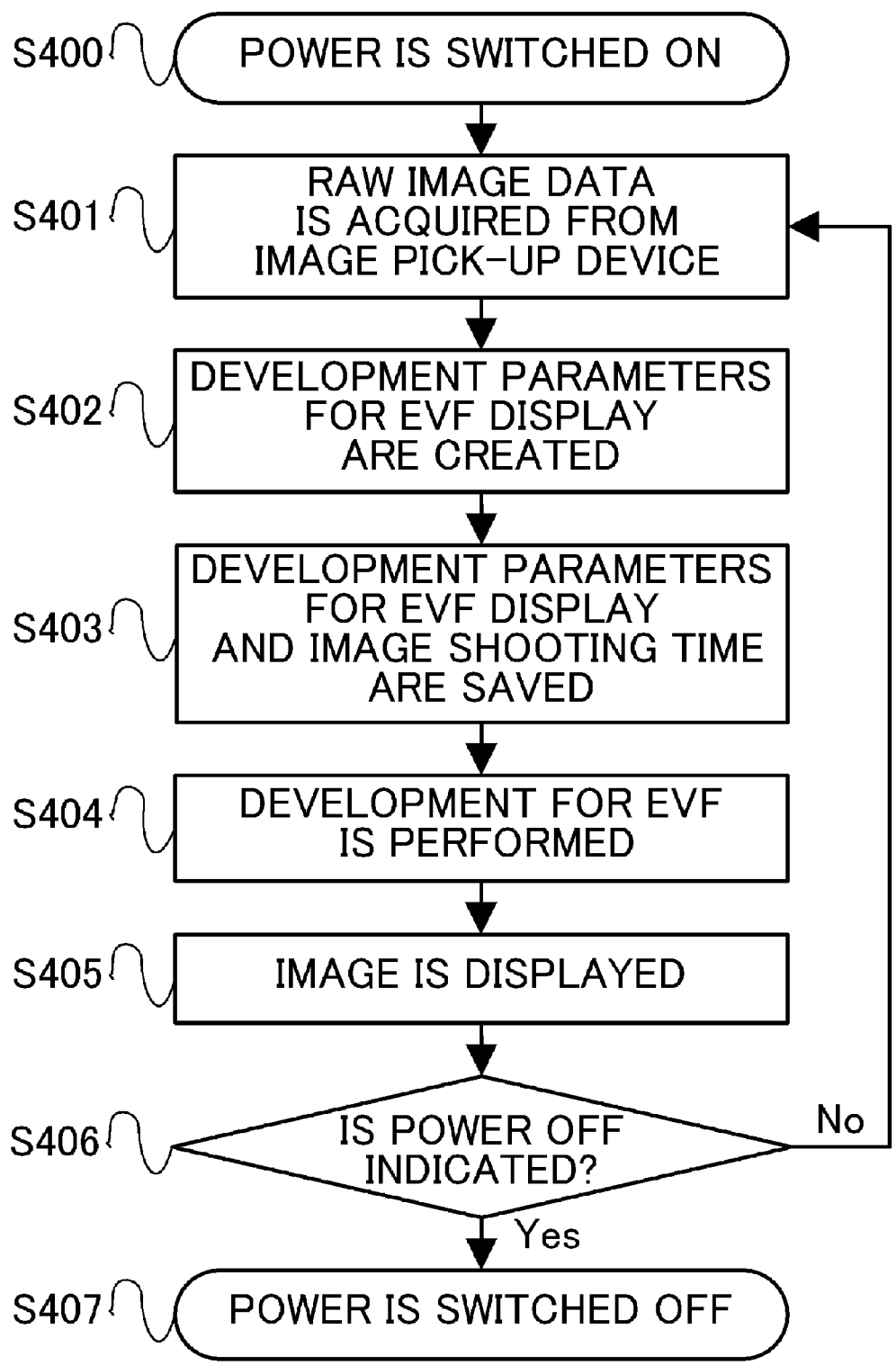
FIG. 4 is a flowchart illustrating an example of processing flow of the EVF display function.

The data 300 for EVF display that is saved in the parameter save region 331 will be described in detail below with reference to FIG. 4. FIG. 4 is a flowchart illustrating the processing flow of the EVF display function.

Where the user sets the power of the image pick-up apparatus 100 to the ON state in S400, the processing advances to S401. In S401, the development parameter creation unit 11 acquires RAW image data from the image pick-up device 10. Then, in S402, the development parameter creation unit 11 creates development parameters for EVF display.

In S403, the development parameter creation unit 11 sends the development parameters for EVF display that have been created in S402 and the shooting time thereof (image shooting time of RAW image data acquired in S401) to the storage unit 13. The storage unit 13 then saves the development parameters for EVF display and the shooting time thereof acquired from the development parameter creation unit 11 in the parameter save region 331.

In S404, the development parameter creation unit 11 sends the development parameters for EVF display created in S402 and the RAW image data acquired in S401 to the development unit 12. The development unit 12 then performs the development processing by using the development parameters for EVF display and RAW image data acquired from the development parameter creation unit 11 and sends the post-development image data created by the development processing to the display panel 14. Then, in S405, the display panel 14 displays the image based on the post-development image data acquired from the development unit 12.

In S406, it is checked whether there is a user's command to switch the power OFF, and when the power OFF has not been indicated, the processing returns to S401. Where the power OFF is indicated, the processing advances to S407. In S407, the image pick-up apparatus 100 turns the power OFF state. The processing from S401 to S406 is performed for each frame of the RAW image. The processing of S403 and S404 may be executed simultaneously and in parallel or in the reverse order.

Figure 5:
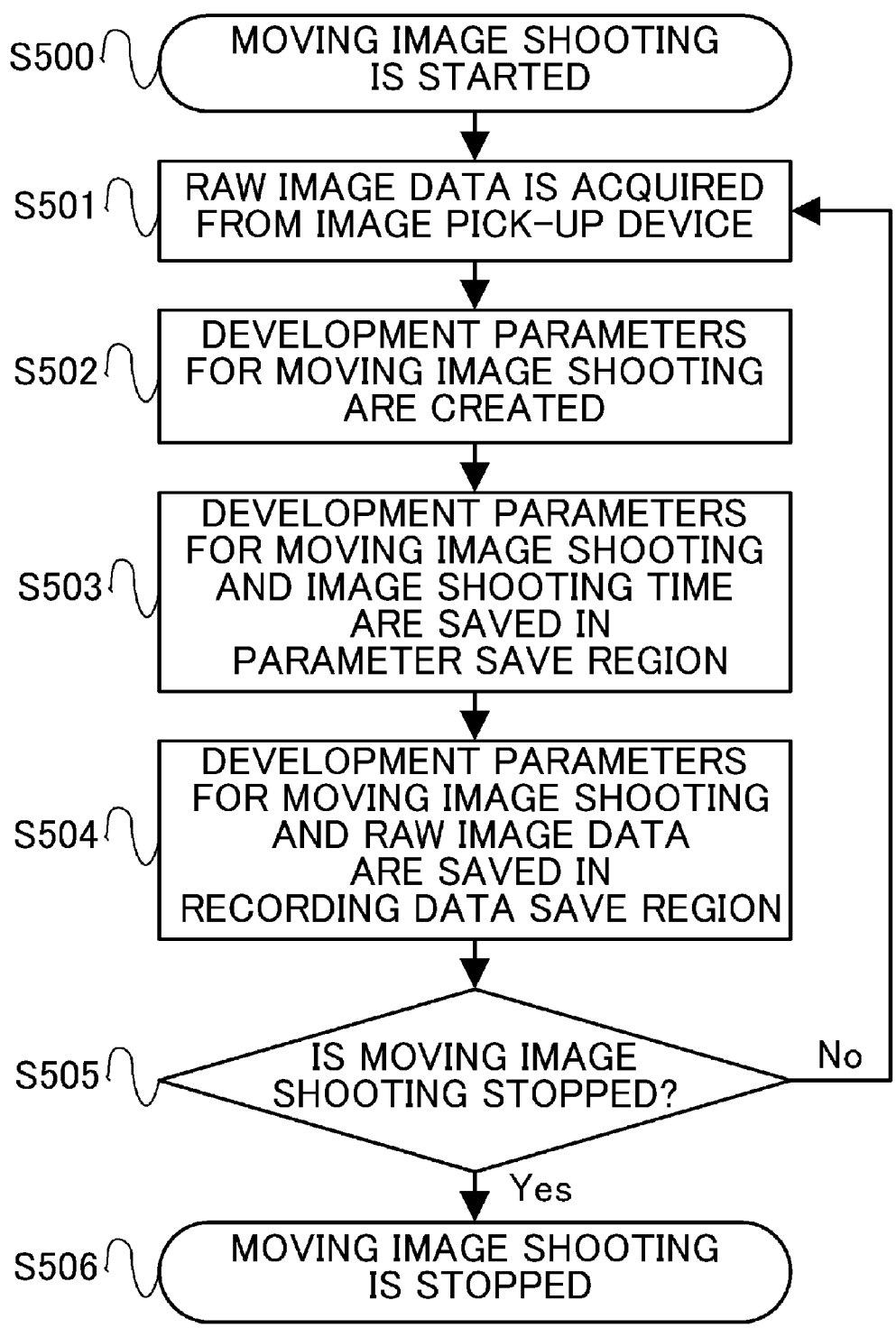
FIG. 5 is a flowchart illustrating an example of processing flow of the moving image shooting function.

The data 310 for moving image shooting that is saved in the parameter save region 331 will be explained in detail below with reference to FIG. 5. FIG. 5 is a flowchart illustrating the processing flow of the moving image shooting function.

First, where the user indicates the start of moving image shooting in S500, the processing flow advances to S501. Since the processing of S501 is similar to that of S401, the explanation thereof is herein omitted. Then, in S502, the development parameter creation unit 11 creates development parameters for moving image shooting.

In S503, the development parameter creation unit 11 sends the development parameters for moving image shooting created in S502 and the shooting time thereof to the storage unit 13. Then, the storage unit 13 saves the development parameters for moving image shooting and the shooting time thereof acquired from the development parameter creation unit 11 in the parameter save region 331.

In S504, the development parameter creation unit 11 sends the development parameters for moving image shooting created in S502, RAW image data acquired in S501, and the shooting time thereof to the storage unit 13. Then, the storage unit 13 saves the development parameters for moving image shooting, image shooting data, and image shooting time acquired from the development parameter creation unit 11 in the recording data save region 332.

In S505, it is checked whether the user has indicated the moving image shooting stop. When the moving image shooting stop has not been indicated, the processing advances to S501, and when the moving image shooting stop has been indicated, the processing advances to S506. In S506, the image pick-up apparatus 100 stops the moving image shooting. The processing from S501 to S505 may be performed for every several frames (for example, two frames) of the RAW image or for each single frame. The processing of S503 and S504 may be executed simultaneously in parallel or in the reverse order.

By executing the above-described flowcharts shown in FIGS. 4 and 5, it is possible to read the development parameters (development parameters for EVF display and development parameters for moving image shooting) created before the image shooting from the storage unit 13 and use the development parameters when the still image shooting is performed.

The data 320 for still image shooting that is saved in the parameter save region 331 and the method for saving the first and second development parameters will be described hereinbelow in greater detail.

Figure 6:
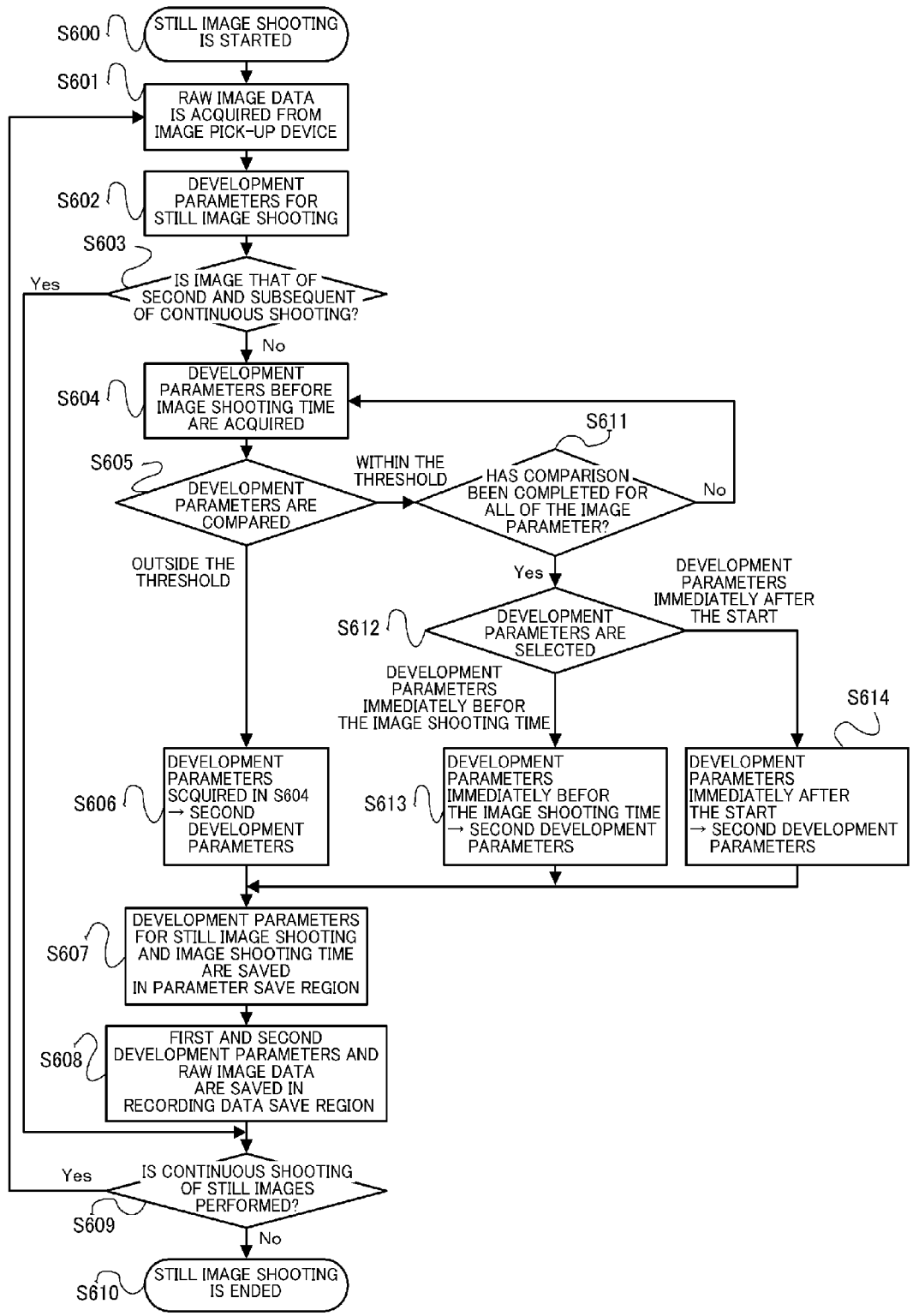
FIG. 6 is a flowchart illustrating an example of processing flow of the still image shooting function.

FIG. 6 is a flow chart illustrating an example of processing flow in the image pick-up apparatus when still image shooting is performed (flowchart illustrating the processing flow of the still image shooting function).

First, where the user indicates the start of still image shooting in S600, the processing flow advances to S601. Since the processing of S601 is similar to that of S401, the explanation thereof is herein omitted. Then, in S602, the development parameter creation unit 11 creates a development parameter for still image shooting (first development parameter).

In S603, it is determined whether the RAW image data (RAW image data that will be saved) acquired by the development parameter creation unit 11 in S601 is that of the second and subsequent shootings of continuous shooting of still images. When continuous shooting of still images is not performed (when a still image is picked up once) or when the RAW image data of the first shooting of continuous shooting of still images is acquired in S601, the processing advances to S604. When the RAW image data of the second and subsequent shootings of continuous shooting of still images is acquired in S601, the processing advances to S608.

The processing of S603 is performed because only one type of development parameter is added to one RAW image datum when continuous shooting of still images is performed. The processing of S603 makes it possible to inhibit the addition of a plurality of development parameters to the RAW image data of the second and subsequent shootings in continuous shooting of still images.

In S604, the development parameters created before the shooting time of RAW image data acquired in S601 are acquired from the parameter save region 331 of the memory 330 of the storage unit 13. In the present embodiment, the development parameters are acquired in the order close to that of the image shooting time of the RAW image data acquired in S601. More specifically, the development parameters for EVF display, development parameters for moving image shooting, and development parameters for still image shooting of the period from the start of the image pick-up apparatus 100 to the still image shooting are all acquired. However, it is also possible to acquire only the development parameters corresponding to the interval from the still image shooting time to a predetermined period before.

Then, in S605, the development parameter creation unit 11 compares the development parameter for still image shooting created in S602 and the development parameter acquired in S604. In the present embodiment, set values of white balance included in the development parameters are compared. When the difference between the set value included in the development parameter for still image shooting created in S602 and the set value included in the development parameter acquired in S604 is equal to or less than a threshold, the processing advances to S611 and when the difference is larger than the threshold, the processing advances to S606. Where a plurality of development parameters have been acquired in S604, these development parameters are taken one by one as comparison objects in the order from the development parameter associated with the image shooting time close to the image shooting time of the RAW image data acquired in S601. The threshold may be a fixed value or may be any value (variable) set by the user.

In S606, the development parameter creation unit 11 sets the development parameter acquired in S604 as the second development parameter that can be used for the development processing of the RAW image data acquired in S601. More specifically, set as the second development parameter is a development parameter that includes a set value for which the difference with the set value included in the development parameter created in S602 is larger than the predetermined threshold and that has been created at the time which is the closest to the image shooting time of the RAW image data acquired in S601. The processing then advances to S607.

In S611, it is determined whether or not all of the development parameters stored in the parameter save region 331 have been used by the development parameter creation unit 11 for comparison in S605. Where the development parameters that have not been used for comparison are present in the parameter save region 331, the processing returns to S604. Where the development parameters that have not been used for comparison are not present in the parameter save region 331 (when the comparison of the development parameters created in S602 and all of the development parameters stored in the parameter save region 331 has been completed), the processing returns to S612.

In S612, the development parameter creation unit 11 selects either of the development parameter created immediately after the image pick-up apparatus 100 has been started and the development parameter created immediately before the still image shooting time (immediately before the shooting time of the RAW image data acquired in S601). Any of the following selection methods may be used: (1) a method by which the development parameter with the largest difference calculated in S604 is selected; (2) a method by which the development parameter set by the user is selected; (3) a method by which the development parameter predetermined (fixed) by the manufacturer is selected (the default is preferably set such that the development parameter created immediately before the still image shooting time is selected). When the development parameter is added that has been created at a time which is the closest to the still image shooting time, the processing advances to S613, and when the development parameter is added that has been created immediately after the image pick-up apparatus 100 has been started, the processing advances to S614. In this case, when the image pick-up apparatus 100 performs EVF display, the development parameter created immediately after the image pick-up apparatus 100 has been started and the development parameter created immediately before the still image shooting time are present. However, when the image pick-up apparatus 100 does not perform the EVF display (the case where the EVF display function is set OFF), the development parameter created immediately after the image pick-up apparatus 100 has been started and the development parameter created immediately before the still image shooting time are sometimes not present. In such a case, the development parameter creation unit 11 selects either the development parameter that has been created at the very beginning after the image pick-up apparatus 100 has been started, or the development parameter created at a time which is the closest to the still image shooting time (shooting time of RAW image data acquired in S601).

In S613 the development parameter creation unit 11 sets the development parameter created immediately before the still image shooting time as the second development parameter that can be used for development processing of the RAW image data acquired in S601. The processing then advances to S607.

In S614, the development parameter creation unit 11 sets the development parameter created immediately after the image pick-up apparatus 100 has been started as the second development parameter that can be used for development processing of the RAW image data acquired in S601. The processing then advances to S607.

When the user briskly performs ON-OFF power switching of the image pick-up apparatus 100, it is highly probable that the development parameter created immediately after the image pick-up apparatus 100 has been started is the development parameter corresponding to the shooting object identical to the picked-up RAW still image data. For this reason, in such a case, it is preferred that the development parameter created immediately after the image pick-up apparatus 100 has been started be set as the second development parameter. Further, when the user does not briskly perform ON-OFF power switching of the image pick-up apparatus 100, it is highly probable that the development parameter created immediately after the image pick-up apparatus 100 has been started is the development parameter corresponding to the shooting object different from the picked-up RAW still image data. For this reason, in such a case, it is not that desirable to set the development parameter created immediately after the image pick-up apparatus 100 has been started as the second development parameter.

In S607, the development parameter creation unit 11 sends the development parameter created in S602 (first development parameter) and the shooting time thereof to the storage unit 13. Then, the storage unit 13 saves this development parameter and the shooting time thereof in the parameter save region 331.

In S608, the development parameter creation unit 11 sends the second development parameter that has been set in S606, S613, or S614, in addition to the development parameter created in S602 (first development parameter), RAW image data acquired in S601, and the shooting time thereof to the storage unit 13. Then, the storage unit 13 saves the transmitted data in the recording data save region 332 in association with each other. Thus, the development parameter created in S602 (first development parameter) and the second development parameter that has been set in S606, S613, or S614 are saved as the development parameters that can be used in the development processing of the RAW image data acquired in S601.

In S609, the development parameter creation unit 11 verifies whether continuous shooting of still images is performed. When continuous shooting of still images is performed, the processing returns to S601, and when continuous shooting of still images is not performed or when the RAW image data acquired in S601 is the very last RAW image data of continuous shooting of still images, the processing advances to S610. In S610, the image pick-up apparatus 100 ends the still image shooting.

Variation Example 1

Figure 7:
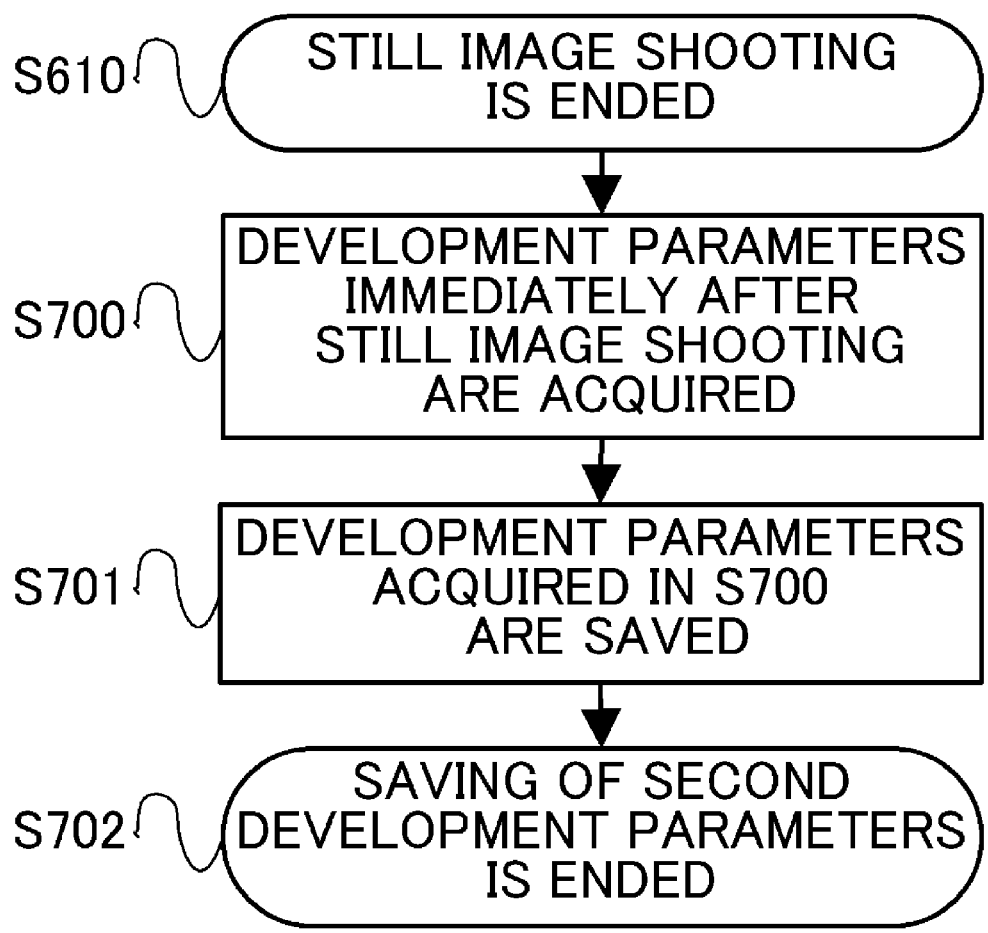
FIG. 7 is a flowchart illustrating an example of processing flow of the still image shooting function.

In Variation Example 1 of the embodiments, when the development parameter created immediately before the still image shooting is saved as the second development parameter, the development parameter created immediately after the image shooting is also saved as the second development parameter. The method for saving the development parameter immediately after the still image shooting is explained in detail below with reference to FIG. 7.

First, where the still image shooting is ended in S610, the processing advances to S700. Then, in S700, the development parameter creation unit 11 acquires the development parameter with the earliest image shooting time time from among the development parameter for EVF display and the development parameter for moving image shooting that have been created immediately after the still image shooting. When the image shooting time of the two is the same, either of the development parameter for EVF display and the development parameter for moving image shooting is acquired. In the case where there is no development parameter created immediately after the still image shooting, the development parameter created at a time that is the closest to the still image shooting time is acquired.

In S701, the development parameter creation unit 11 sends the development parameter acquired in S700 to the storage unit 13 as the second development parameter. Then, the storage unit 13 saves the sent second development parameter in the recording data save region 332 in association with the RAW image data saved in S608. Then, the processing advances to S702 and saving of the second development parameter is ended.

Variation Example 2

Figure 8:
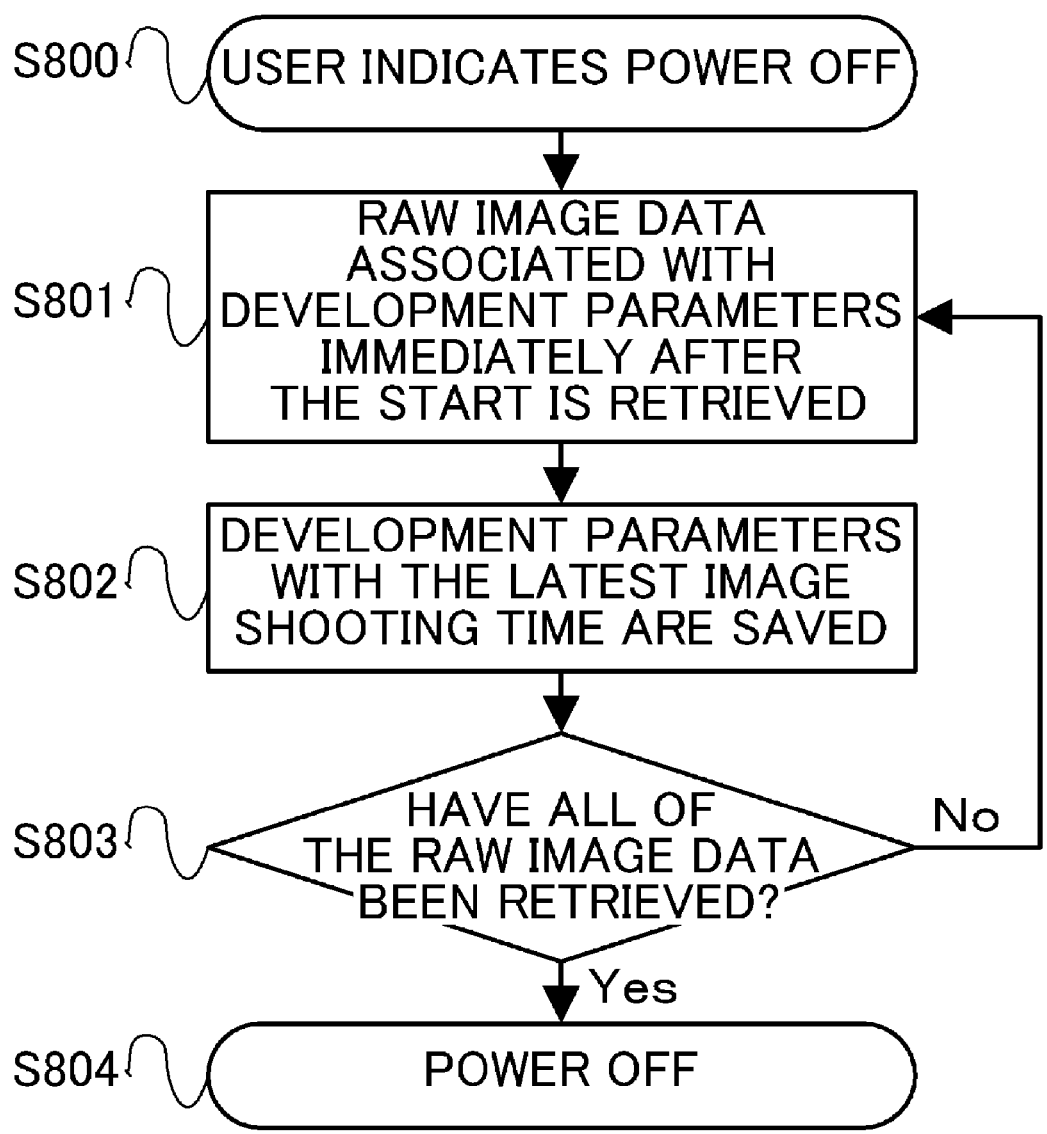
FIG. 8 is a flowchart illustrating an example of processing flow of the still image shooting function.

In Variation Example 2 of the embodiments, when the development parameter created immediately after the image pick-up apparatus 100 has been started is saved as the second development parameter, the development parameter created immediately before power OFF in the image pick-up apparatus 100 is also saved as the second development parameter. The method for saving the development parameter immediately before power OFF is explained in detail below with reference to FIG. 8.

First, where the user indicates power OFF in S800, the processing advances to S801.

In S801, the development parameter creation unit 11 retrieves the RAW image data (RAW still image data) that has been saved in association with the development parameter immediately after the start from the recording data save region 332.

Then, in S802, the development parameter creation unit 11 sends a development parameter created at a time which is the closest to the time in which S800 has been executed, from among the development parameters stored in the parameter save region 331, as the second development parameter to the storage unit 13. Thus, the development parameter with the latest image shooting time, from among the development parameters stored in the parameter save region 331, is sent to the storage unit 13 as the second development parameter. The storage unit 13 then saves the transmitted second development parameter in association with the RAW image data retrieved in S801.

Then, in S803, the development parameter creation unit 11 verifies whether the processing of S801 has been performed with respect to all of the RAW still image data saved in the recording data save region 332. When the processing has not been performed with respect to all of the RAW still image data, the processing returns to S801, and when the processing has been performed with respect to all of the RAW still image data, the processing advances to S804. Then, in S804, the image pick-up apparatus 100 turns the power OFF state.

As described hereinabove, according to the present embodiment, when the RAW image data (RAW still image data) is saved in the memory unit, the second development parameter created at a different time is saved as a parameter that can be used in development processing of the RAW image data, in addition to the first development parameter created when the still image is picked up. As a result, by selecting the second development parameter as an initial value when the development parameter (first development parameter) obtained when the still image is picked up is different from the desired development parameter, the user can rapidly correct the development parameters.

Further, in the present embodiment, any of the development parameter created when the EVF display is performed, the development parameter created when the moving image shooting is performed, and the development parameter of RAW image data (RAW still image data) picked up at a time different from the image shooting time of the RAW image data (RAW still image data) that will be saved is saved as the second development parameter. As a result, the number of candidates for the second development parameter can be increased and a more preferred second development parameter can be acquired. In particular, since the development parameter is created periodically when the EVF display is performed, a more preferred second development parameter can be acquired by taking such a development parameter as a candidate for the second development parameter.

When the set values of white balance included in the first development parameter and second development parameter are close to one another, it is possible that both the first development parameter and the second development parameter are different from the desirable development parameter. In the present embodiment, the development parameter including a set value for which the difference with the set value of white balance included in the first development parameter is larger than the predetermined threshold is saved as the second development parameter. As a result, when the first development parameter is different from the desirable development parameter, the development parameter that is close to the desirable development parameter can be acquired with a higher probability as the second development parameter.

The development parameter created at a time separated significantly from the image shooting time of the RAW image data that will be saved is highly probable to be different from the desirable development parameter (to be obtained under environment that differs significantly from the desirable image shooting environment). In the present embodiment, the development parameter created at a time that is as close as possible to the image shooting time of the RAW image data that will be saved, from among the development parameters including the set values for which the abovementioned difference is larger than the predetermined threshold, is taken as the second development parameter. As a result, when the first development parameter is different from the desirable development parameter, the development parameter that is close to the desirable development parameter can be acquired with a higher probability as the second development parameter.

Further, in the configuration of the present embodiment, the development parameters are created only when the RAW image data is picked up, but the development parameters may be also created at times other than when the RAW image data is picked up (independently of image shooting).

In the configuration of the present embodiment, the development parameter created immediately before the image shooting time of the RAW image data that will be saved, from among the development parameters including the set values for which the abovementioned difference is larger than the predetermined threshold, is saved as the second development parameter. Further, when such a development parameter is not present, another development parameter is saved as the second development parameter. More specifically, the development parameter created immediately before or immediately after the image shooting time of the RAW image data, or the development parameter created immediately after power ON and immediately before power OFF of the image pick-up apparatus is saved as the second development parameter. However, the second development parameter is not limited to these development parameters. The second development parameter may be created at the image shooting time different from the image shooting time of the RAW image data that will be saved. For example, all of the above-described five development parameters (four development parameters in the case in which the development parameter including the set value for which the abovementioned difference is larger than the predetermined threshold is not present) may be saved as the second development parameter. Furthermore, other development parameters may also serve as the second development parameter.

One or a plurality of development parameters may be taken as the second development parameter. Where a plurality of development parameters created at mutually different times are saved as the second development parameters, the number of initial values during the adjustment of development parameters can be increased and convenience for the user can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-251548, filed on Nov. 10, 2010, and Japanese Patent Application No. 2011-191467, filed on Sep. 2, 2011, which are hereby incorporated by reference herein in their entirety.

What is claimed is:

1. An image pick-up apparatus, comprising:
an image pick-up unit that picks up an image of an object and outputs RAW still image data;
a creation unit that creates, when the RAW still image data is picked up, a development parameter that is a parameter used in development processing which is an image processing for converting the RAW still image data to a post-development still image data and including information that changes depending on image shooting environment; and
a saving unit that saves, in a storage unit, the development parameter created when the RAW still image data is picked up as a first development parameter which can be used in development processing of the RAW still image data, and further saves, in the storage unit, a development parameter created at other time as a second development parameter which can be used in development processing of the RAW still image data, when saving the RAW still image data outputted from the image pick-up unit in the storage unit.

2. The image pick-up apparatus according to claim 1, wherein
the information that changes depending on image shooting environment is a set value that determines white balance.

3. The image pick-up apparatus according to claim 2, wherein
the saving unit saves, as the second development parameter, a development parameter that includes a set value for which the difference with a set value included in the first development parameter is larger than a predetermined threshold.

4. The image pick-up apparatus according to claim 3, wherein
the saving unit saves, as the second development parameter, a development parameter that includes a set value for which the difference with a set value included in the first development parameter is larger than a predetermined threshold and that has been created at a time which is the closest to a shooting time of the saved RAW still image data.

5. The image pick-up apparatus according to claim wherein
the saving unit saves, as the second development parameter, a plurality of development parameters that have been created at mutually different times.

6. A control method for an image pick-up apparatus, comprising the steps of:
picking up an image of an object and outputting RAW still image data;
creating, when the RAW still image data is picked up, a development parameter that is a parameter used in development processing which is an image processing for converting the RAW still image data to a post-development still image data and including information that changes depending on image shooting environment; and
saving, in a storage unit, the development parameter created when the RAW still image data is picked up as a first development parameter which can be used in development processing of the RAW still image data, and further saving, in the storage unit, a development parameter created at other time as a second development parameter which can be used in development processing of the RAW still image data, when saving the outputted RAW still image data in the storage unit.

7. The image pick-up apparatus according to claim 1, wherein
the second development parameter is at least one development parameter from among a development parameter created for electronic viewfinder display, a development parameter created for moving image shooting, and a development parameter created when RAW still image data other than the saved RAW still image data is picked up.

8. The image pick-up apparatus according to claim 1, wherein
the saving unit saves the RAW still image data, the first development parameter and the second development parameter in association with each other.

9. The control method for an image pick-up apparatus according to claim 6, wherein
the information that changes depending on image shooting environment is a set value that determines white balance.

10. The control method for an image pick-up apparatus according to claim 9, wherein
in the saving, a development parameter that includes a set value for which the difference with a set value included in the first development parameter is larger than a predetermined threshold is saved as the second development parameter.

11. The control method for an image pick-up apparatus according to claim 10, wherein
in the saving, a development parameter that includes a set value for which the difference with a set value included in the first development parameter is larger than a predetermined threshold and that has been created at a time which is the closest to a shooting time of the saved RAW still image data is saved as the second development parameter.

12. The control method for an image pick-up apparatus according to claim 6, wherein
in the saving, a plurality of development parameters that have been created at mutually different times are saved as the second development parameter.

13. The control method for an image pick-up apparatus according to claim 6, wherein
the second development parameter is at least one development parameter from among a development parameter created for electronic viewfinder display, a development parameter created for moving image shooting, and a development parameter created when RAW still image data other than the saved RAW still image data is picked up.

14. The control method for an image pick-up apparatus according to claim 6, wherein
   in the saving, the RAW still image data, the first development parameter and the second development parameter are saved in association with each other.

* * * * *